May 24, 1960

N. M. CLARK 2,937,497

GAS TURBINE-DRIVEN PLANT

Filed March 2, 1956

INVENTOR
Neil M. Clark
BY
Stevens, Davis, Miller & Mosher
ATTORNEYS

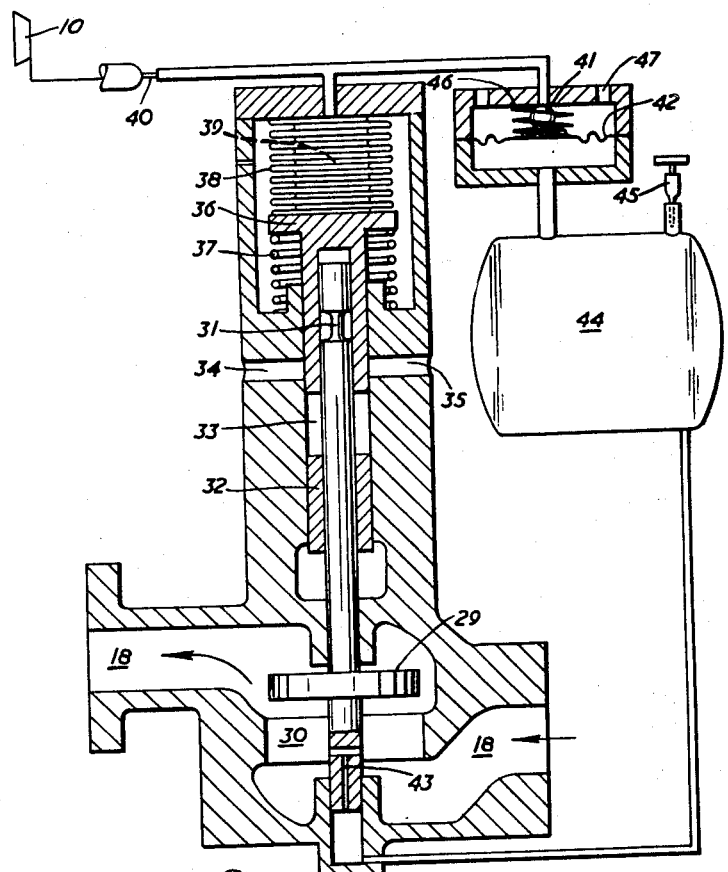
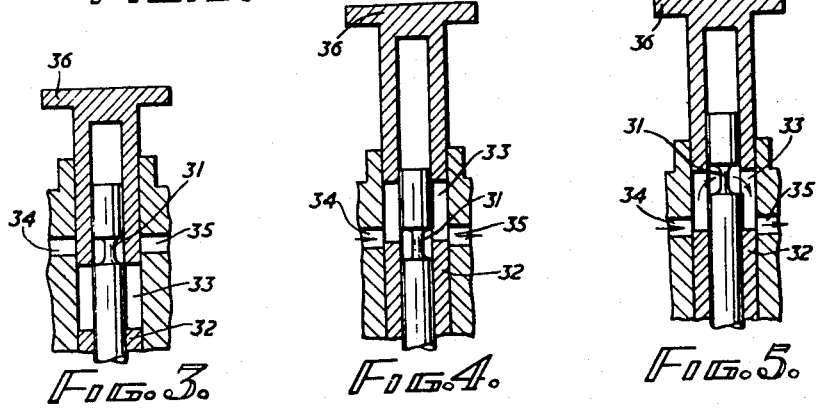

May 24, 1960  N. M. CLARK  2,937,497
GAS TURBINE-DRIVEN PLANT
Filed March 2, 1956  3 Sheets-Sheet 3

INVENTOR
Neil Milligan Clark
BY Stevens, Davis, Miller & Mosher
his ATTORNEYS

United States Patent Office 2,937,497
Patented May 24, 1960

2,937,497
GAS TURBINE-DRIVEN PLANT

Neil M. Clark, Camberley, England, assignor to Power Jets (Research and Development) Limited, London, England, a British company Filed Mar. 2, 1956, Ser. No. 569,083

Claims priority, application Great Britain Aug. 26, 1955

6 Claims. (Cl. 60—39.16)

This invention relates to gas turbine-driven plant operable to produce a compresssed gaseous output.

It has already been proposed to provide such plant which is capable of producing an output of variable mass flow at a pressure level above the maximum gas turbine cycle pressure. A control arrangement previously suggested for this apparatus ensures that a wide range of mass flow can be obtained, whilst the rotary components are maintained in a satisfactory operating condition and, in particular, compression surge is avoided. However, that control arrangement succeeded in maintaining the plant in a running condition, when the output demand was reduced substantially to zero, only at the cost of a fuel consumption about 60% of that at full load demand. It is clearly desirable to provide a more economic idling arrangement.

According to the present invention there is provided gas turbine-driven plant operable to produce a compressed gaseous output at a pressure level above the maximum gas turbine cycle pressure and comprising a mechanism responsive to a reduction of output demand substantially to zero to override the normally-operative fuel supply governor control and to restrict the fuel input to a predetermined idling rate.

The mechanism can be arranged to respond directly to changes in output flow and it preferably incorporates a delaying device preventing the fuel input restriction from being effected immediately upon flow demand reduction.

In one form the mechanism comprises a first valve adapted to be conditioned towards the fuel input restriction when the demand reduction takes place and a second valve normally adapted to prevent such conditioning of the first valve from taking effect but permitting the effect to occur after an interval determined by said delaying device.

Restoration of demand may be arranged to affect the mechanism so that the fuel input rate is gradually increased until the governor control again becomes effective. This process may be accomplished in two stages with an immediate increase in fuel rate up to a predetermined rate followed by controlled further increase.

The arrangement of the plant may comprise low and high pressure air compression means, a combustion system fed from said low pressure air compression means, turbine means drivingly connected to said compression means and fed with working fluid from said combustion system, an output supply duct from said high pressure compression means, a governor arranged via a fuel valve to control the fuel input to the combustion system and drivingly interconnected with said high pressure compression means, a fuel throttle valve operable to override the governor-controlled valve and an interconnection between said mechanism and said throttle. Such an arrangement of plant may further comprise an air storage tank connected to the output duct via a non-return valve.

Embodiments of the present invention will now be described, by way of example only, with reference to the accompanying drawings in which:

Figure 2 is a sectional elevation of a sensing device for the output demand in such a plant as is shown in Figure 1 and a mechanism for controlling the fuel input accordingly.

Figures 3, 4 and 5 are detail sectional views of valve operation in the mechanism of Figure 2.

Figure 1:
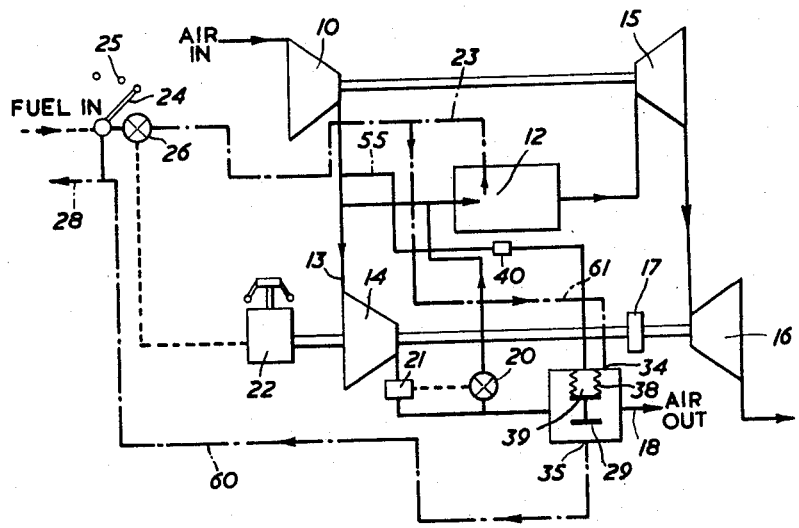
Figure 1 is a cycle diagram of a gas turbine-driven air compressing plant with fuel input thereto subject to governor and output demand control.

The plant shown in Figure 1 is an air compressing plant arranged for cross compounded gas turbine drive. A low pressure compressor 10 receives air and after compressing it, feeds it in two streams, one via the duct 11 to a combustion chamber 12 and the other via a duct 13 to a high pressure compressor 14. The two compressors are respectively driven by turbines 15 and 16, which are supplied in series with hot gases from the combustion chamber 12. The turbine 16 drives the compressor 14 through a gear train 17. The output of the high pressure compressor 14 is delivered to the user via the outlet duct 18 and between this duct and duct 11 there is a by-pass 19 controlled by a valve 20. The latter is made responsive to a control device 21 which senses the operating condition of the high pressure compressor and is arranged to keep that condition surge-free. In normal operation, a governor 22 maintains substantially constant the rotational speed of the high pressure compressor 14 by exercising control over the fuel input through the pipe 23 to the combustion chamber 12.

In patent application Serial No. 490,372, now Patent No. 2,811,302, it is explained how reduction of flow through the outlet duct 18 results in the opening of valve 20, whilst the speed of the high pressure compressor 14 and its throughput are maintained. Whilst the control system deals satisfactorily with fluctuations in load which may be expected in normal use, it is uneconomic by itself if the plant is likely to be idling for any considerable time. The fuel consumption is dropped to about 60% of that at full load if the valve 20 is wide open; this cannot be allowed to persist for lengthy periods.

As shown in Figure 1, a mass flow monitor or sensing device 29, which is described in greater detail with reference to Figures 2–6 is mounted in the outlet duct 18 to initiate fuel control directly responsive to load conditions.

The mass flow monitor includes a bellows 38, a space 39 inside which is connected to the output duct of the low pressure compressor 10 by a duct 55. A more detailed description of the mass flow monitor arrangement and its operation is given with reference to Figure 2 of the drawings. The mass flow monitor controls a valve arrangement with ports 34, 35 which in turn control fuel input to the combustion chamber 12. The ported valve arrangement 34, 35 is connected in a spill fuel line 60, 61 which is connected to the fuel pipe 23 between the governor controlled valve 26 and the combustion chamber 12. The fuel line 60 is connected to a conduit 28 to return fuel to a tank (not shown in the drawings). Manual operation of the idling control may be effected by setting the throttle valve handle 24 to a position 25. The fuel supply is maintained constant through a pipe 27 by surplus or spill determined by the setting of the handle 24 or the ported valve arrangement 34, 35 and fuel is returned to the tank via conduit 28.

It should be understood that the idling control may be arranged to become effective even though the net output is never, in operation, reduced to zero, since there may be leaks in the air consuming equipment. It is adjusted to come into use at an output flow corresponding to the leakage.

Figure 2 shows in greater detail the device 29, 34 and 35 shown in Figure 1. The mass flow monitor or sensing device 29 is in the form of a simple dead weight piston which will lift with a relatively small differential pressure. The piston and its spindle are arranged on a vertical axis to travel in a cylindrical passage 30 situated in the duct 18 through which the air flows from the plant to the consumer. When the piston lifts off its lowest sealing position, it travels an appreciable distance with no change in flow area (i.e. clearance around the piston) until it clears its shroud and can then pass the full flow with very little more movement.

The upper part of the piston spindle is arranged as a valve and has a deep groove 31. Sliding over the spindle is a sleeve 32, constrained to prevent rotation and having a pair of opposed elongated ports 33. Rod and sleeve together slide in a fixed valve box which has opposed ports 34, 35, disposed at the correct position relative to the sleeve. As shown in Figure 1 the inlet port 34 is connected to the burner fuel line 23 by a conduit 61, and port 35 drains back via spill conduits 60 and 28 to the fuel tank.

The sleeve carries a plunger 36 at its upper end. This is subjected to forces exerted by spring 37 and the bellows 38 within a chamber open to the atmosphere. The space 39 within the bellows is connected to the output of the low pressure compressor 10 by the duct 55, as shown in Figure 1, in which there is a restriction 40 and to a leakaway or vent valve 41 normally closed by air pressure on a diaphragm 42.

Beneath the piston 29 and within the space 30, which communicates with the high pressure compressor discharge, is a small piston valve 43, which also acts as the bottom guide for piston 29. The outlet of this valve connects with the diaphragm 42 and vent valve 41 via a small reservoir 44.

The operation of the mechanism is as follows:

Assume the plant to be delivering compressed air and running at governed speed. The piston 29 is lifted clear of its shroud by the slight pressure drop across it, caused by the air flow, and the valve 31 is in its uppermost position. The plunger 36 and the sleeve 32 are forced down against the spring 37 by pressure of the compressed air in the bellows 38. This pressure is maintained because the vent valve 41 is kept closed by air pressure on the diaphragm 42, sustained by the high pressure delivery via valve 43.

With the spindle valve in its upper position and sleeve 32 in its lowest position, the passage of fuel to the spill conduit via ports 34 and 35 is prevented, and the governor thus maintains its control.

If the demand for air ceases completely (apart from airline leakage), the piston 29 falls because it is situated downstream of the by-pass duct 19 leading to the anti-surge valve 20. The piston rod extension with its valve 43 cushions the fall of the piston. The valve 31 is now in the lower position, shown in Figure 3, i.e. opposite ports 34 and 35, but fuel is prevented from escaping from the burner line 23 to drain by sleeve 32; the ports 33 not yet being aligned with the body parts 34 and 35.

The air pressure in the relay line via valve 43 is now cut off, and the air in reservoir 44 leaks slowly away through an adjustable leak 45. When the pressure in the reservoir 44 is sufficiently reduced, the spring 46 acting on diaphragm 42 overcomes the air pressure and opens the vent valve 41 to atomsphere via the aperture 47; this at once releases most of the pressure in bellows 39. The sleeve 32 at once rises under the action of spring 37 and brings ports 33 into communication with the valve 31, as shown in Figure 4. This allows a definite spill flow and reduces the fuel input to a predetermined rate, thus bringing the gas turbine unit down to its idling condition by overriding the effect of the governor 22.

When there is a resumed demand on the air delivery duct 18, the piston 29 lifts to the position shown in Figure 5 and, because sleeve 32 is still in its upper position, there is still a limited leakage path for fuel from 34 to 35. The passage for escape of fuel being now partly restricted, the fuel input to the combustion system increases to a value dependent on the dimensions of the ports 33 in the sleeve, these ports being dimensioned so as not to "over-fuel" the engine. The engine will therefore begin to accelerate. By the lifting of piston 29 air is admitted to the reservoir 44 via valve 43 at a much faster rate than it is escaping through the leak 45. The pressure in the reservoir 44 quickly rises to that of the high pressure compressor. Although the output pressure is still substantially below that at full speed, the diaphragm and spring assembly 42, 46, is arranged so that the pressure available is sufficient to shut vent valve 41. This admits low pressure compressor delivery pressure to bellows 38, so overcoming the force due to spring 37 and thus slightly depressing plunger 36. In turn, this further restricts the escape of fuel from ports 34 and 35 to drain. The acceleration of the gas generator set is then cumulative, further acceleration gradually cutting off the escape of fuel until finally there is no fuel spill. Thus fuel input corresponding to full speed is regained, and normal governor control is resumed.

The sleeve valve 32 also acts as an acceleration-control device even when the engine is being run-up on hand throttle, thus preventing over-fuelling of the engine during the starting period.

Figure 6:
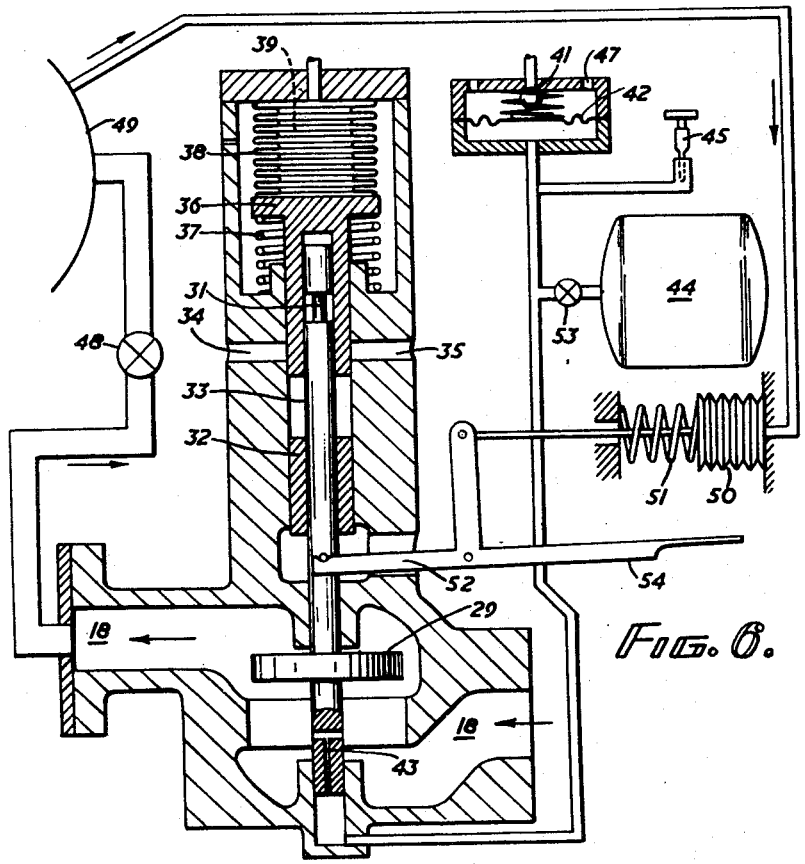
Figure 6 shows an arrangement generally similar to that of Figure 2 but modified so that the compressed air output may be delivered into a storage tank.

Figure 6 shows a mechanism generally similar to that described above with relation to Figures 2 to 5 but modified to allow for supply of an air storage tank and for manual maintenance of full output demand flow if required. The cycle diagram is similar to that shown in Figure 1. The plant is connected via the outlet duct 18 and a non-return valve 48 to the storage tank 49. By placing this non-return valve 48 downstream of the sensing device already described, the mechanism will perform its prescribed function of reducing the running speed of the set during periods of no demand, since the flow through the piston valve 29 drops virtually to zero when the pressure in the vessel 49 reaches the maximum which the plant will deliver at its governed speed. Because of the existence of the non-return valve, however, there is no flow past the piston valve 29 when a demand is made on the storage vessel, and so the pressure in the storage vessel 49 is fed to a bellows 50, the pressure in which opposes the action of spring 51. The bellows collapse when the pressure in the tank 49 falls to a predetermined value corresponding approximately to the delivery pressure at full load. The spring 51 then acts on and lifts the lever 52 thus initiating the acceleration of the plant. The latter will not, of course, start delivering air to the storage vessel until it has accelerated sufficiently for its delivery pressure to overcome the pressure in the vessel 49 and thus open the non-return valve.

Figure 6 also shows a re-arrangement of the small reservoir 44, and the leakaway valve 45. The reservoir 44 is here placed in a branch from the pipe interconnecting the valve 43 and diaphragm 42, with a valve 53 to isolate it. When the plant is used to maintain pressure in a storage tank, this valve 53 can be shut, because the delay period in throttling back the fuel input is not necessary in this case.

In Figure 6, the lever 52, which restores the plant to normal operation, is also able to be manually operated. By pressing down the handle 54, the piston valve 29 can be kept off its seating to allow a full load running condition to be maintained.

What I claim is:

1. Gas turbine-driven plant comprising low pressure air compression means, high pressure air compression means connected in series flow with said low pressure air compressor means, a combustion system connected in series flow with said low pressure compression means and in parallel flow with said high pressure compression means, a fuel system arranged to supply fuel to said combustion system, first turbine means drivingly connected to said low pressure compression means, second turbine means drivingly connected to said high pressure compression means and both arranged to be supplied with working fluid produced by said combustion system, a compressed air outlet duct from said high pressure compression means, a governor drivingly interconnected with said high pressure compression means, a sensing device responsive to the air flow to output through said duct, first valve means in said fuel system controlled by said governor, second valve means positioned in said fuel system to override the effect of said first valve means, a first valve part in said second valve means and directly connected to said sensing device so that reduction substantially to zero of air flow to output through said duct causes movement of the first valve part in a sense to reduce fuel input from the fuel system to said combustion system and a second valve part in said second valve means normally held in such position as to nullify said movement of said first valve part.

2. Gas turbine-driven plant as claimed in claim 1 and comprising a differential pressure device, conduit connections from said low pressure compression means and from said outlet duct to said device, means for cutting off said conduit connection from the outlet duct when the flow to output therethrough is reduced substantially to zero and means under control of said differential pressure device for releasing said second valve part thereby permitting movement of the first valve part to take effect.

3. Gas turbine-driven plant as claimed in claim 2 and comprising means for introducing a delaying effect upon said differential pressure device before its response to the connection from said outlet duct being cut off.

4. Gas turbine driven plant as claimed in claim 1 in which said sensing device comprises a two-position flow monitor in said outlet duct arranged to remain in one position except when the flow to output through said duct is reduced substantially to zero on which it moves to the other position.

5. Gas turbine-driven plant as claimed in claim 4 and comprising a spindle on said monitor, a groove in said spindle constituting said first valve part, a movable sleeve around said spindle and ports in said sleeve co-operable with said groove, the sleeve and its ports constituting said second valve part.

6. Gas turbine-driven plant as claimed in claim 4 and comprising manually operable means for maintaining said monitor in said one position even when said output flow is reduced substantially to zero.

References Cited in the file of this patent

UNITED STATES PATENTS

| | | |
|---|---|---|
| 1,280,811 | Moss | Oct. 8, 1918 |
| 2,743,051 | Grey | Apr. 24, 1956 |

FOREIGN PATENTS

| | | |
|---|---|---|
| 627,783 | Great Britain | Aug. 16, 1949 |